United States Patent
Hsia et al.

(10) Patent No.: US 10,634,852 B1
(45) Date of Patent: Apr. 28, 2020

(54) PACKAGING OF A FIBER-OPTIC TRANSPORT HEAD WITH HEAT DISPERSION MECHANISMS

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

(21) Appl. No.: 16/518,958

(22) Filed: Jul. 22, 2019

(51) Int. Cl.
*G02B 6/36* (2006.01)
(52) U.S. Cl.
CPC .................................. *G02B 6/3624* (2013.01)
(58) Field of Classification Search
CPC .................................................... G02B 6/3624
See application file for complete search history.

(56) References Cited

U.S. PATENT DOCUMENTS

| | | | |
|---|---|---|---|
| 8,983,256 B2 * | 3/2015 | Konishi | G02B 6/3624 385/100 |
| 9,360,643 B2 * | 6/2016 | Rinzler | G02B 6/3813 |
| 9,638,877 B2 * | 5/2017 | Blomster | G02B 6/036 |
| 9,662,173 B1 * | 5/2017 | Griffin | A61B 18/24 |
| 10,082,630 B1 * | 9/2018 | Hsia | G02B 6/14 |
| 10,101,550 B1 * | 10/2018 | Hsia | G02B 6/4432 |
| 10,209,453 B1 * | 2/2019 | Hsia | G02B 6/3624 |
| 10,218,142 B1 * | 2/2019 | Hsia | H01S 3/0407 |
| 10,481,339 B2 * | 11/2019 | Lee | G02B 6/14 |
| 2016/0141826 A1 * | 5/2016 | Johnson | H01S 3/06704 372/6 |

* cited by examiner

*Primary Examiner* — Ryan A Lepisto
(74) *Attorney, Agent, or Firm* — Han IP PLLC; Andy M. Han

(57) ABSTRACT

A water-cooled package of a fiber-optic transport head comprising a delivery optical fiber (DOF), an interface optics, an end plug, a waterproof tube, and a housing operates for delivering a high-power laser light from DOF to free space. The interface optics is fusion-spiced with a section of DOF with a cladding exposed whereas the section of DOF is enclosed in a bore of the waterproof tube. In one embodiment, the waterproof tube comprises a first set of internal threads comprising a first helix angle and a first tooth height. In another embodiment, the housing comprises a second set of internal threads comprising a second helix angle and a second tooth height. Either one of the first set and the second set of internal threads facilitates thermal dispersion, effectively reducing temperature on the housing.

19 Claims, 9 Drawing Sheets

PACKAGING OF A FIBER-OPTIC TRANSPORT HEAD WITH HEAT DISPERSION MECHANISMS

TECHNICAL FIELD

The present disclosure relates to packaging of a fiber-optic transport head used in high power laser delivery applications and, more particularly, to heat dispersion mechanisms in an indirect water-cooled scheme in packaging such a fiber-optic transport head with a delivery optical fiber not immersed in cooling water to maintain long-term reliability of the delivery optical fiber and laser beam quality when a high-power laser light is delivered to free space.

BACKGROUND

High-power fiber lasers have received a wide attention in the past ten years. Such lasers with several kilowatts (kWs) or several tens of kWs have been used as commercially available products in industries. In comparison with solid-state lasers, fiber lasers have a unique feature of a superb beam quality at high power due to an all-fiber configuration. That is, all the optical components used in the fiber lasers are of an optical fiber type, connected using fusion splices without air interfaces between any two of the optical components in connection. The optical components include multiple diode laser pumps with multiple optical fiber pigtails, an amplification optical fiber with two fiber Bragg gratings, a transmission fiber spliced to the amplification optical fiber, and an optical fiber combiner with multiple input optical fibers to splice to the multiple optical fiber pigtails of the multiple diode laser pumps and with an output optical fiber to splice to the amplification optical fiber. The amplification optical fiber, doped with a rare earth element such as erbium (Er) or ytterbium (Yb) as a gain medium, provides for a beneficial geometry and a large surface to volume ratio, thus allowing for extraordinary heat dispersion and reducing thermal lensing effect when compared to rod type solid state lasers. The amplification optical fiber with the gain medium receives and absorbs optical energy from the multiple diode laser pumps through the optical fiber combiner and creates a coherent laser light via a resonator built by using the two fiber Bragg gratings at two ends of the amplification optical fiber. Such multimode fiber lasers in the 2- to 6-kW regime are ideal for cutting and welding, and particularly in the area of materials processing and laser machining as a reliable replacement for bulky diode pumped solid-state lasers and $CO_2$ lasers. It has been shown that lengthening the amplification optical fiber can inherently increase power of the fiber lasers without a limit. However, double clad optical fibers (DCOFs) used in both the output optical fiber of the optical fiber combiner and the amplification optical fiber are surrounded by a polymer coating with a limited tolerance to heat. In other words, the maximum thermal load provided by the coating dictates the maximum output power that the fiber laser can attain.

Not similar to optical fibers used in optical communications, where the coatings outside the optical fibers simply play a role of mechanical protection, the polymer coatings used in DCOFs perform both mechanical and optical functions. DCOFs use dual acrylate coatings, with a first low refractive index polymer coating in contact with the glass core, and with a durable second coating to protect the first relatively soft low refractive index coating. In other words, the second coating mechanically protects the low refractive index coating from mechanical chips, cuts, or scratches which may result in optical energy to leak out from the fiber, possibly creating localized hot spots or catastrophic burns at high pump powers. DCOFs with the dual acrylate coating can pass the stringent reliability test specified by Telcodia GR-20 standard used in the telecom industry. Without doubt, DCOFs with the dual acrylate coating have a high tensile strength of greater than 700 kilo-pounds per square inch (kpsi) and an exceptional stress corrosion resistance. However, according to the GR-20 standard, after exposing DCOFs to an environment of 85° C. and 85% relative humidity (RH) for 720 hours, it shows an excess loss for laser output power due to possible degradation of the low refractive index coating in exposure to temperature and humidity. It is noted that the 85° C./85% condition not only affects the optical reliability of the low refractive index coating but also causes OH ingression into the glass core of the optical fiber, increasing attenuation of the glass core. For example, the attenuation in the typical pump wavelength range is well below a negligible 0.01 dB/m. After exposure the optical fiber to temperature and humidity, either wavelength-dependent or independent attenuation increases. The attenuation, in general, is associated with OH ingression in the silica, glass defects formed due to moisture ingression, and light scattered by the low refractive index polymer. That is, during the 85° C./85% RH test, moisture not only degrades the low-index polymer but also penetrates the glass cladding, resulting in the excess fiber loss.

In high-power laser delivery applications, a laser light or optical energy from a fiber laser is delivered to an application area using a transmission optical fiber or a delivery optical fiber. In the application area, the laser light must exit from an optical fiber end to free space. In order to maintain laser beam quality and prevent optical components upstream and downstream from damaging, a residual pump power, an amplified spontaneous emission (ASE) power, or an undesired signal power captured in the cladding of a DCOF in an optical fiber laser or an optical fiber amplifier needs to be removed. The residual pump power can be in hundreds of watts in kW fiber lasers, and the ASE can be in the range of several tens of watts, typically much higher in a fiber amplifier. A conventional way to remove the cladding light is to remove the low refractive-index fluoroacrylic coating for a length of the optical fiber and re-coat with a high refractive-index coating. Such an optical component is called cladding mode stripper. In this approach, a high numerical aperture (NA) cladding light will be more effectively stripped than a low-NA cladding light. However, this approach remains very useful because the low-NA pump light in the cladding is, in fact, more strongly absorbed in a fiber laser, leaving more of the high-NA light in the residual pump in the cladding. One real issue is that the act of cladding stripping is occurred over just several millimeters, creating a localized hot spot, which needs to be thermally managed to prevent the cladding mode stripper from damaging. Several different cladding mode strippers with longitudinal variations have been proposed to improve hot spot localization but to suffer from increased complexity.

Surfaces substantially perpendicular to a laser propagating direction are vulnerable to the high power-density laser light because any of surface imperfections such as impurity, defects, and contamination and Fresnel reflections due to a refractive index change when the laser light moves between two media can lower a damage threshold of the surfaces, easily burning down the surface. That is one of reasons that a fiber laser system is so popular over a solid-state laser nowadays because the possible number of surfaces is minimized by splicing all the optical fiber components in the system together, thus significantly increasing system's reliability. In many fiber laser applications, the laser light must exit from an optical fiber to free space. With a coreless piece of optical fiber, so called optical end cap, placed between the output end of the fiber laser and the free space, the risk of damage at the end face can be dramatically reduced. In this case, the beam expands along the coreless end cap, thereby reducing an optical power density at the end face and also back reflection due to the divergence in the beam.

As mentioned above, the optical end cap sustainable at high power is critical for highly reliable high-power fiber lasers. In the high-power fiber lasers, an integrated water-cooled package has been proposed, in which an optical end cap is completely immersed in the circulating water for efficient cooling. In this case, however, OH ingression in the silica and glass defects generated from moisture ingression can reduce the reliability of such an optical end cap. It is, therefore, the purpose of this patent application to disclose several heat dispersion mechanisms in packaging a fiber-optic transport head without immersing a delivery optical fiber in cooling water. The advantages include un-deteriorated attenuation and unstressed core and cladding of the delivery optical fiber, which shows long-term reliability and unaffected speckle patterns and beam quality when a high-power laser light is delivered to free space.

SUMMARY

A water-cooled package of a fiber-optic transport head comprising a delivery optical fiber configured to transport a laser light, an interface optics, an end plug, a waterproof tube, and a housing. The interface optics comprises a first end face against a forward propagation direction of the laser light. The first end face is fusion-spiced with a section of the delivery optical fiber with a cladding exposed. The interface optics is a coreless piece of optical fiber configured to expand a beam size of the laser light delivered by the section of the delivery optical fiber with the cladding exposed, thereby reducing power density not exceeding a damage threshold and to deliver the laser light from the delivery optical fiber to free space without accumulating heat created by the laser light forward propagated, backward propagated, or scattered and without burning out the delivery optical fiber. The section of the delivery optical fiber with the cladding exposed may be partially coated with a polymer with a higher refractive index than that of the cladding exposed. The section of the delivery optical fiber with the cladding exposed further coated with the polymer is configured to strip cladding modes as a cladding mode stripper. The end plug comprises a second end face in the forward propagation direction of the laser light and a bore configured for the section of the delivery optical fiber with the cladding exposed to pass through without introducing micro-bending and stress on the section of the delivery optical fiber with the cladding exposed, which affects beam quality of the laser light emitting to free space. However, the end plug may further comprise a secondary holder to hold and fix the delivery optical fiber in place.

The waterproof tube comprises a first inner wall and a bore enclosing the section of the delivery optical fiber with the cladding exposed. The waterproof tube is coupled between the end plug and the interface optics and may be sealed by using various O-rings. The waterproof tube is configured to keep cooling water from immersing the section of the delivery optical fiber with the cladding exposed, thereby maintaining long-term reliability thereof.

The housing comprises an internally hollow space and a second inner wall. The housing is configured to hold and fix the end plug and the interface optics in a way that a cavity enclosed by the end plug, the interface optics, the waterproof tube, and the second inner wall is formed with cooling water accommodated inside the cavity, facilitating thermal dispersion. The housing is waterproof at each of interfaces between the interface optics and the waterproof tube, between the waterproof tube and the end plug, between the interface optics and the second inner wall, and between the end plug and the second inner wall such that the section of the delivery optical fiber is not immersed in the cooling water.

In one embodiment, the waterproof tube is embodied by a copper tube. The first inner wall in the copper tube comprises a first grooved structure configured to increase thermal area of the first inner wall and to facilitate thermal dispersion. The first grooved structure may comprise a first set of internal threads. The first set of internal threads may comprise a first helix angle in a range of 10 to 20 degrees such that the cladding modes from the section of the delivery optical fiber with the cladding exposed launch on the first set of internal threads and reflect randomly throughout the first inner hollow space. The first set of internal threads may further comprise a tooth height in a range of 0.1 to 0.3 millimeter (mm) to increase heat exchange capability. The first set of internal threads may further comprise a tooth number in a range of 40 to 70 around a circumference of the first inner wall to increase surface area thereof for a heat exchange. When the cladding modes from the section of the delivery optical fiber with the cladding exposed, forward propagated, backward propagated, reflected, or scattered launch the first inner wall numerous times throughout the copper tube, any localized hot spots will not exist.

In another embodiment, the waterproof tube is embodied by an optically transparent tube. In this case, the second inner wall may comprise a second grooved structure configured to increase thermal area of the second inner wall and to facilitate thermal dispersion. The second grooved structure may comprise a second set of internal threads. The second set of internal threads may comprise a second helix angle in a range of 10 to 30 degrees, in which case, the cladding modes from the section of the delivery optical fiber with the cladding exposed may pass through the optically transparent tube 403, forward propagated, backward propagated, reflected, or scattered, launch randomly the second inner wall numerous times throughout the cavity, any localized hot spots will not exist. Furthermore, the second helix angle in the range of 10 to 30 degrees may help make a cooling water flow revolving around an axis line of the cavity 503 and to generate a secondary water flow, thereby enhancing a convective heat transfer and increasing a heat transfer coefficient. The second set of internal threads may further comprise a tooth height in a range of 0.1 to 0.3 millimeter (mm) to increase heat exchange capability. The second set of internal threads may further comprise a tooth number in a range of 40 to 70 around a circumference of the second inner wall to increase surface area of the second inner wall for a heat exchange.

The interface optics may further comprise a right circular cone portion, and a cylindrical portion. The right circular cone portion comprises a conical surface with a conical angle greater than a divergence angle of the laser light propagating into the interface optics to avoid optical loss and beam quality degradation due to optical clipping. The first end face may be protruded from the right circular cone portion along a conical axis with a diameter greater than a cladding diameter of the section of the delivery optical fiber with the cladding exposed to maximize optical energy received from the section of the delivery optical fiber with the cladding exposed. Such a protrusion is pertinent to a heating process when the first end face is fusion-spliced with the section of the delivery optical fiber with a cladding exposed.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
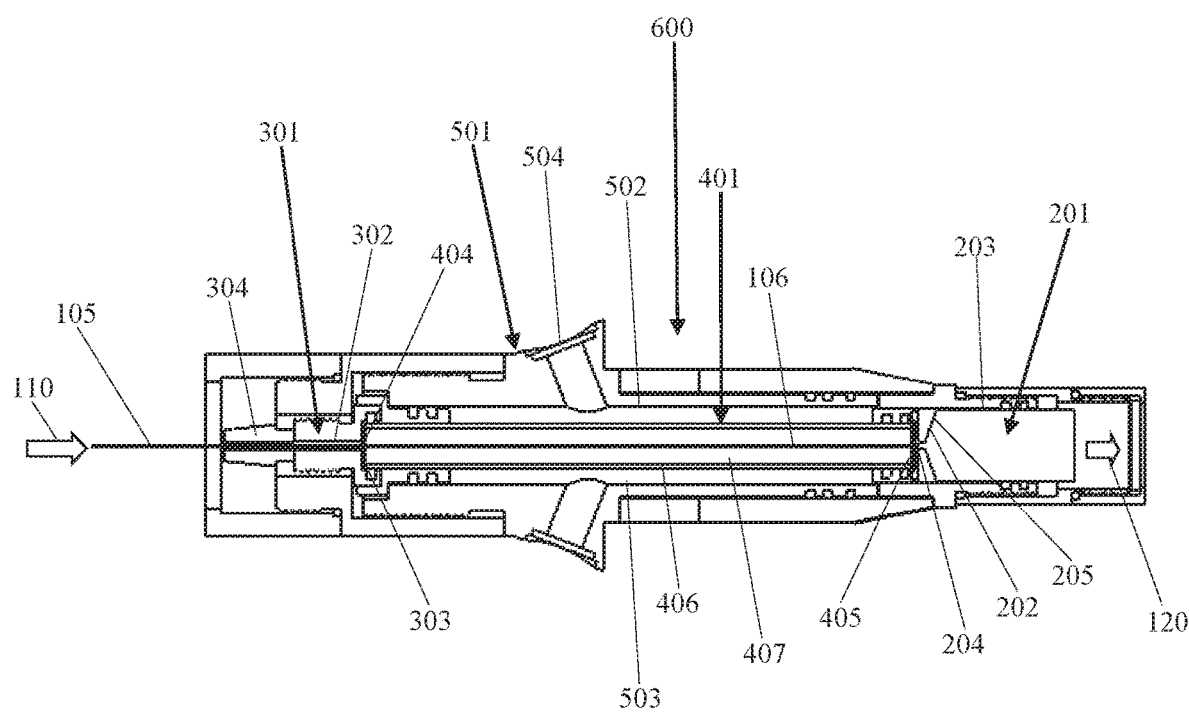
FIG. 1 is a cross-section view of a package of a fiber-optic transport head in a first embodiment according to the present disclosure.

Reference will now be made in detail to the preferred embodiments of the disclosure. Wherever possible, same or similar reference numerals are used in the drawings and the description to refer to the same or like parts. The drawings are in their simplest form and are not to scale.

Figure 2:
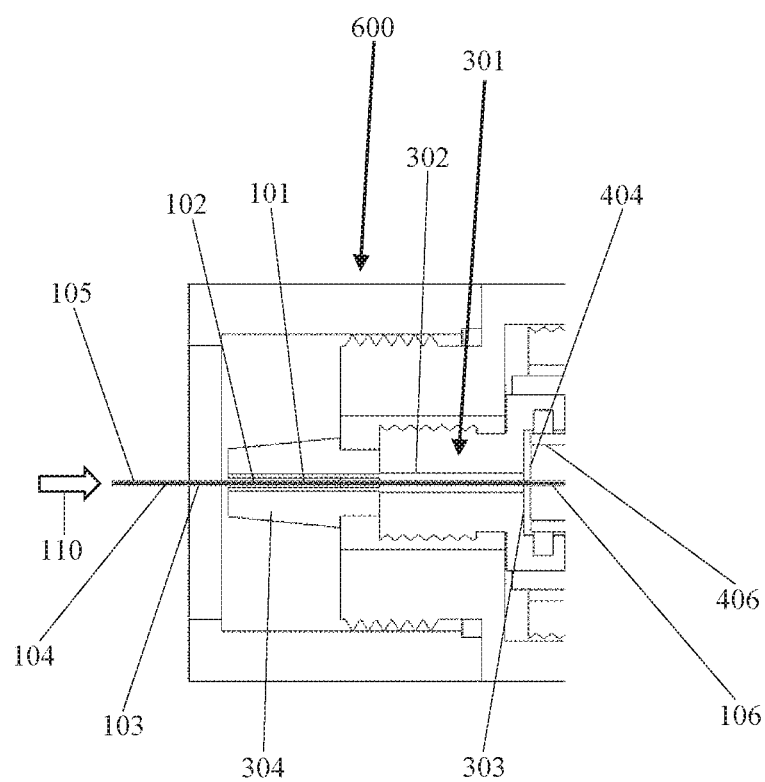
FIG. 2 is a partial enlargement of the cross-section view in FIG. 1 according to the present disclosure.
Figure 3:
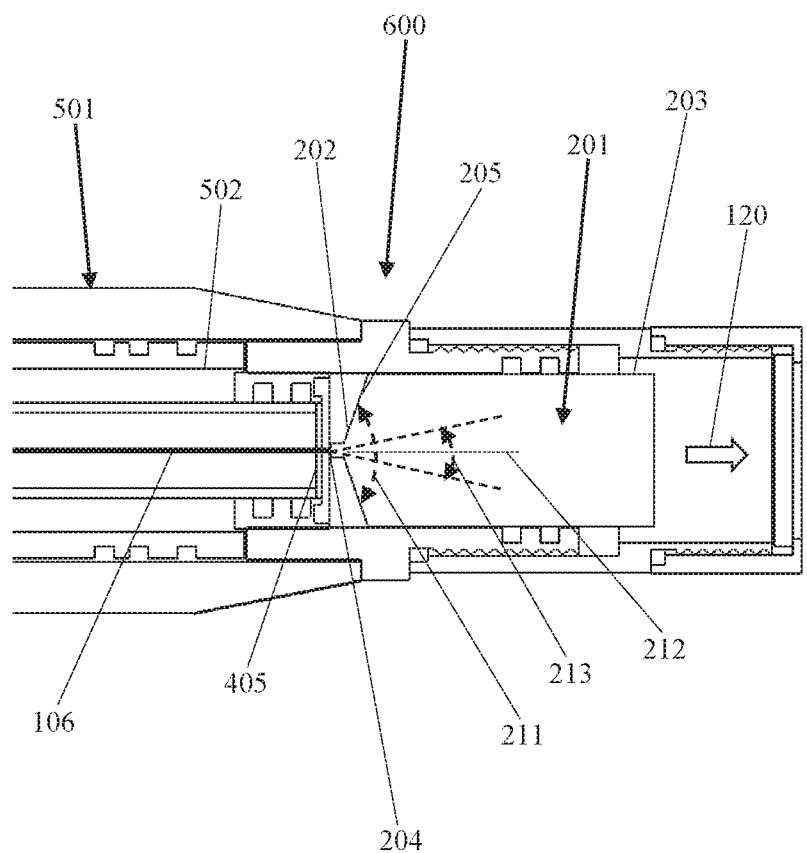
FIG. 3 is another partial enlargement of the cross-section view in FIG. 1 according to the present disclosure.

FIG. 1 is a cross-section view of a package of a fiber-optic transport head in a first embodiment according to the present disclosure. A package of a fiber-optic transport head 600 comprises an interface optics 201, an end plug 301, a waterproof tube 401, and a housing 501. The package of the fiber-optic transport head 600 receives a high-power laser light 110 via a delivery optical fiber 105 and emits a laser light 120 to free space. FIG. 2 is a partial enlargement of the cross-section view near the end plug 301 in FIG. 1 according to the present disclosure. FIG. 3 is another partial enlargement of the cross-section view near the interface optics 201 in FIG. 1 according to the present disclosure. Referring to FIGS. 1-3, the delivery optical fiber 105 comprises a glass core 101, a cladding 102, a buffer layer 103, and a jacket 104 with a section of delivery optical fiber 106 in which the buffer layer 103 and the jacket 104 are removed with the cladding 102 exposed. The section of delivery optical fiber 106 with the cladding 102 exposed (the section of delivery optical fiber 106 with the cladding exposed, hereinafter) is inserted into a first inner hollow space 407 of the waterproof tube 401.

In FIG. 1 and FIG. 3, the interface optics 201 comprises a first end face 204 against a forward propagation direction of the high-power laser light. The first end face 204 is fusion-spiced with the section of the delivery optical fiber 106 with the cladding exposed. The interface optics 201 is a coreless piece of optical fiber configured to expand a beam size of the high-power laser light 110 delivered by the section of the delivery optical fiber 106 with the cladding exposed, thereby reducing power density not exceeding a damage threshold and to deliver the high-power laser light 110 from the delivery optical fiber 105 to emit the laser light 120 to free space without accumulating heat created by the high-power laser light 110 forward propagated, backward propagated, reflected, or scattered and without burning out the section of the delivery optical fiber 106 with the cladding exposed.

In FIG. 1 and FIG. 3, the interface optics 201 further comprises a right circular cone portion 202 and a cylindrical portion 203. The right circular cone portion 202 comprises a conical surface 205 with a conical angle 211 greater than a divergence angle 213 of the laser light propagating into the interface optics 201 to avoid optical loss and beam quality degradation due to optical clipping. As can be seen in FIG. 3, the first end face 204 is protruded from the right circular cone portion 202 along a conical axis 212 and fusion-spliced with a section of the delivery optical fiber 106 with the cladding exposed. Such a protrusion of the first end face 204 is configured to facilitate to fusion-splice the section of the delivery optical fiber 106 with the cladding exposed on a central position of the first end face 204. The protrusion of the first end face 204 is pertinent to a heating process when the first end face 204 is fusion-spliced with the section of the delivery optical fiber 106 with a cladding exposed. The first end face 204 may have a diameter greater than a diameter of the section of the delivery optical fiber 106 with the cladding exposed to maximize optical energy received from the section of the delivery optical fiber 106 with the cladding exposed.

In FIG. 1 and FIG. 2, the end plug 301 comprises a second end face 303 in the forward propagation direction of the high-power laser light 110 and a bore 302 configured for the section of the delivery optical fiber 106 with the cladding exposed to pass through without introducing micro-bending and stress on the section of the delivery optical fiber 106 with the cladding exposed, which affects beam quality of the laser light 120 emitting to free space. However, the end plug 301 may further comprise a secondary holder 304 to hold and fix the delivery optical fiber 105 in place without introducing too much micro-bending and stress on the delivery optical fiber 105 because of a protection from the buffer layer 103 and the jacket 104.

In FIGS. 1-3, the waterproof tube 401 comprises a first end 404, a second end 405, a first inner wall 406, and an inner hollow space 407 enclosing the section of the delivery optical fiber 106 with the cladding exposed. The waterproof tube 401 is coupled between the interface optics 201 and the end plug 301 and sealed by using various O-rings (not shown). The waterproof tube 401 is configured to keep the cooling water from immersing the section of the delivery optical fiber 106 with the cladding exposed, thereby maintaining long-term reliability of the section of the delivery optical fiber 106 with the cladding exposed.

In FIG. 1, the housing 501 comprises an internally hollow space and a second inner wall 502. The housing 501 is configured to hold and fix the end plug 301 and the interface optics 201 in a way that a cavity 503 enclosed by the end plug 301, the interface optics 201, the waterproof tube 401, and the second inner wall 502 is formed with the cooling water accommodated inside the cavity 503, facilitating optical and thermal dispersion. The housing 501 further comprises a pair of water inlet and outlet 504 configured to circulate the cooling water and to remove heat from the interface optics 201, the end plug 301, and the waterproof tube 401, facilitating thermal dispersion. The housing 501 is waterproof at each of interfaces between the interface optics 201 and the waterproof tube 401, between the waterproof tube 401 and the end plug 301, between the interface optics 201 and the second inner wall 502, and between the end plug 301 and the second inner wall 502 such that the section of the delivery optical fiber 106 with the cladding exposed is not immersed in the cooling water. In FIG. 1, the section of the delivery optical fiber 106 with the cladding exposed may pass through the bore 302 of the end plug 301 without bonding, in which a varying stress-induced phenomenon such as fiber speckle patterns can be largely reduced, potentially improving beam quality of the high-power laser light 120 exiting the interface optics 201.

Figure 4:
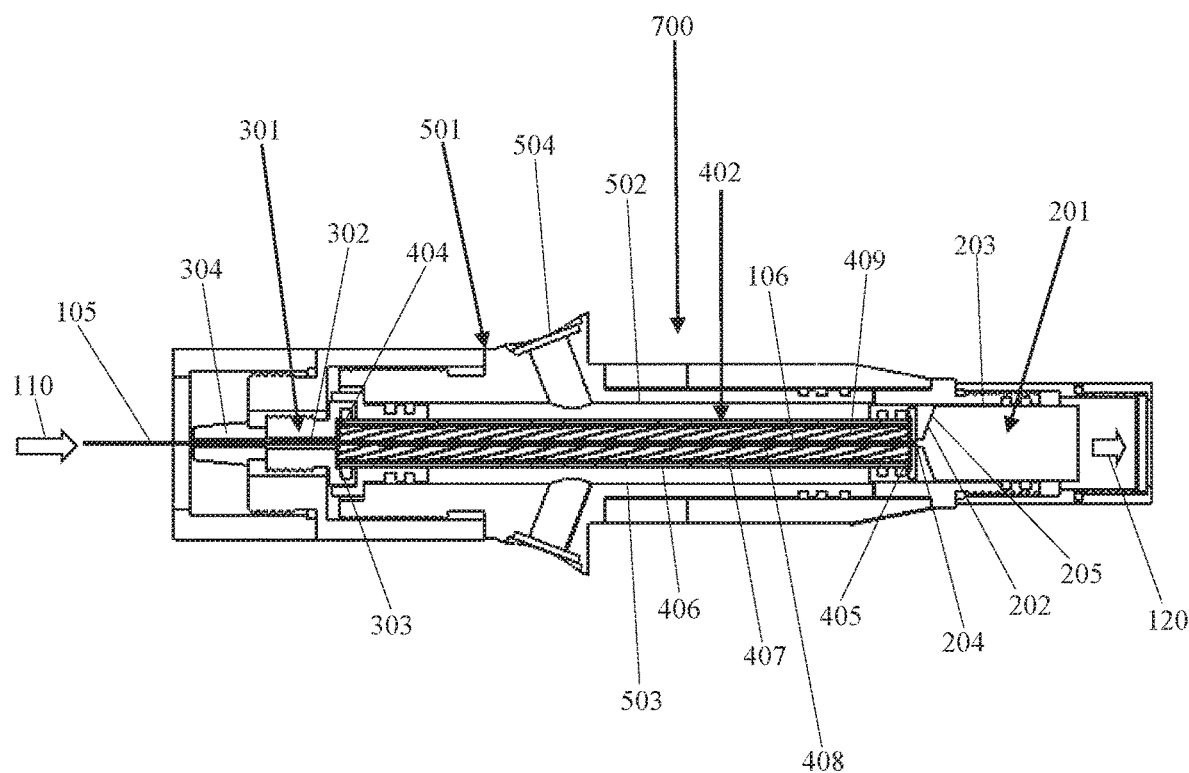
FIG. 4 is a cross-section view of a package of a fiber-optic transport head in a second embodiment according to the present disclosure.
Figure 5:
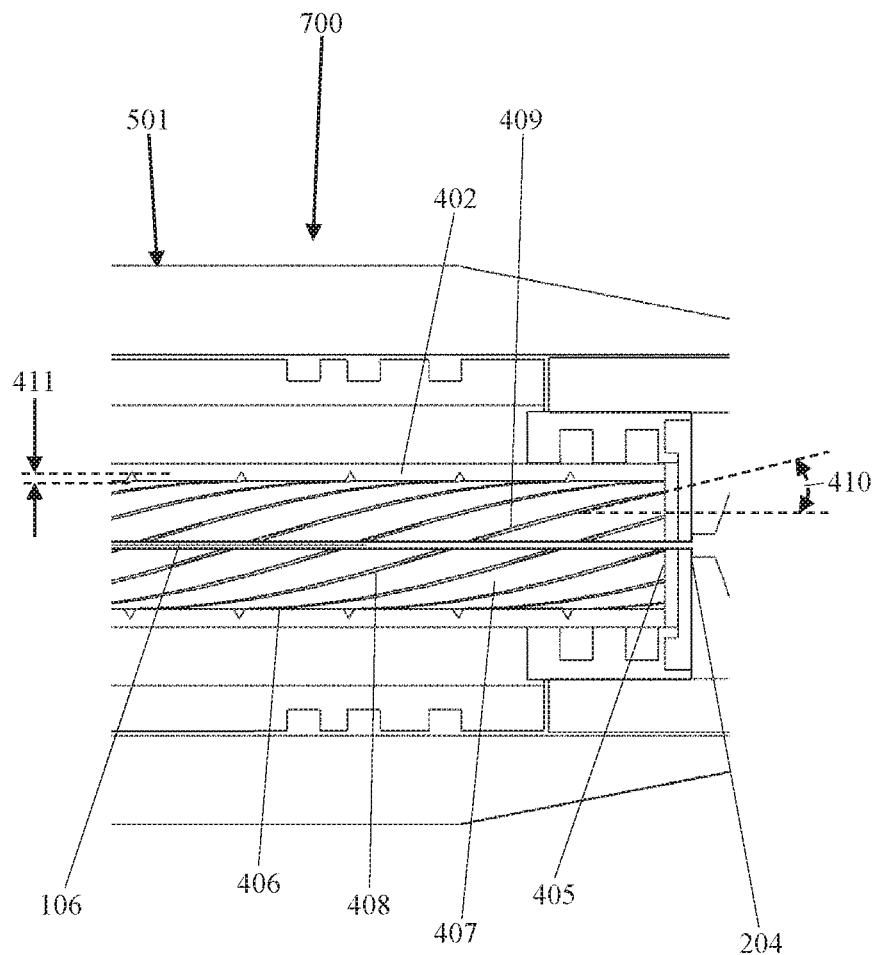
FIG. 5 is a partial enlargement of the cross-section view in FIG. 4 according to the present disclosure.
Figure 6:
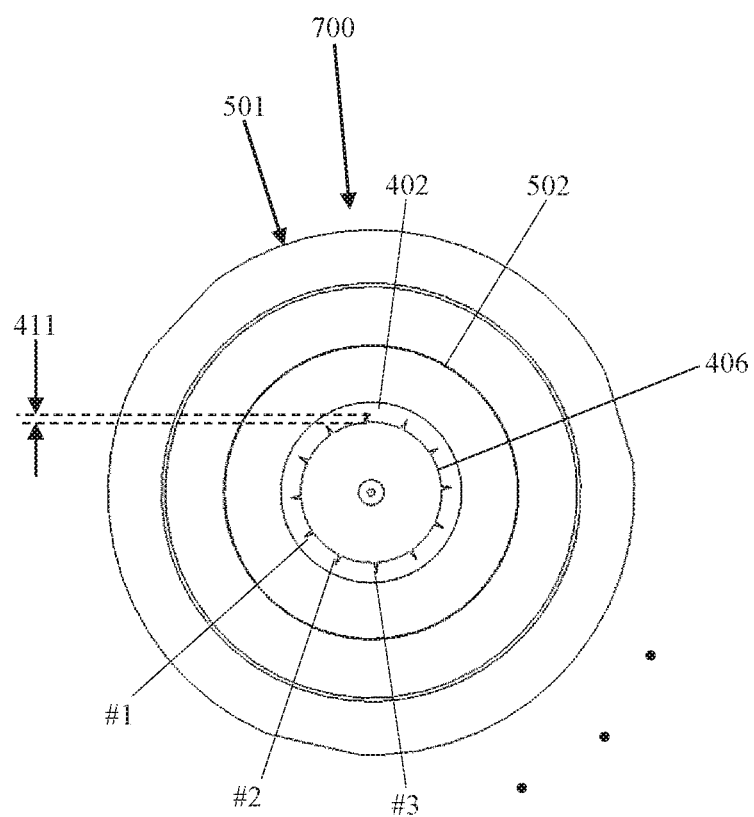
FIG. 6 is another cross-section view of the package of a fiber-optic transport head in a second embodiment according to the present disclosure.

FIG. 4 is a cross-section view of a package of a fiber-optic transport head in a second embodiment according to the present disclosure. In FIG. 4, the package of the fiber-optic transport head 700 comprises all the elements in the package of the fiber-optic transport head 600 as depicted in FIG. 1, except that the waterproof tube 401 in FIG. 1 is embodied by a copper tube 402. The first inner wall 406 in the copper tube 402 comprises a first grooved structure 408 configured to increase thermal area of the first inner wall 406 and to facilitate thermal dispersion. The first grooved structure 408 may comprise a first set of internal threads 409. FIG. 5 is a partial enlargement of the cross-section view in the package of the fiber-optic transport head 700 in FIG. 4 according to the present disclosure. FIG. 6 is another cross-section view perpendicular to the forward propagation direction of the laser light in the package of the fiber-optic transport head 700 in the second embodiment according to the present disclosure. In FIG. 5, the first set of internal threads 409 may comprise a first helix angle 410 in a range of 10 to 20 degrees that the first set of internal threads 409 makes with the conical axis 212 of the right circular cone portion 202 or a line parallel to the conical axis 212. In this case, the cladding modes leaking out of the section of the delivery optical fiber 106 with the cladding exposed, forward propagated, backward propagated, reflected, or scattered launch the first inner wall 409 numerous times in the copper tube and reflect randomly throughout the first inner hollow space 407, resulting in a dramatic temperature reduction on the interface optics 201, the end plug 301, and the housing 501. The first set of internal threads 409 may further comprise a tooth height 411 (FIG. 5 and FIG. 6) in a range of 0.1 to 0.3 millimeter (mm) to increase heat exchange capability. In FIG. 6, the first set of internal threads 409 may further comprise a tooth number in a range of 40 to 70 around a circumference of the first inner wall 406 to increase surface area thereof for a heat exchange.

Figure 7:
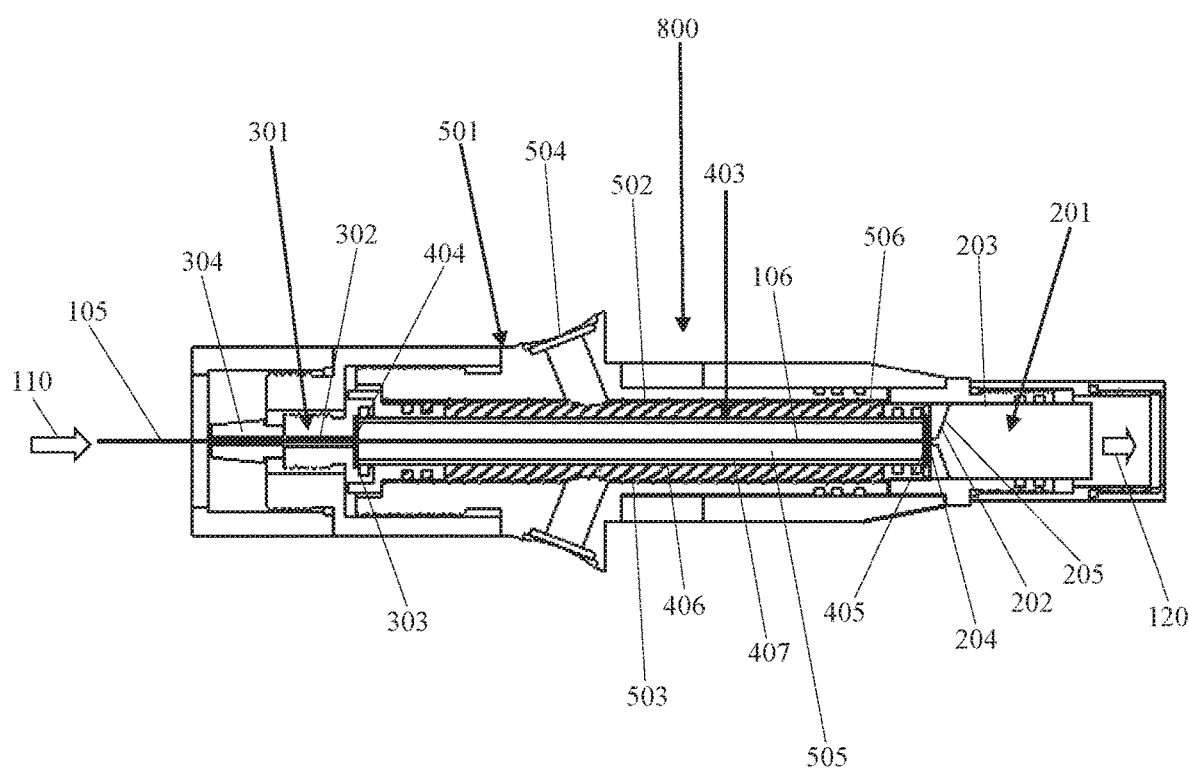
FIG. 7 is a cross-section view of a package of a fiber-optic transport head in a third embodiment according to the present disclosure.
Figure 8:
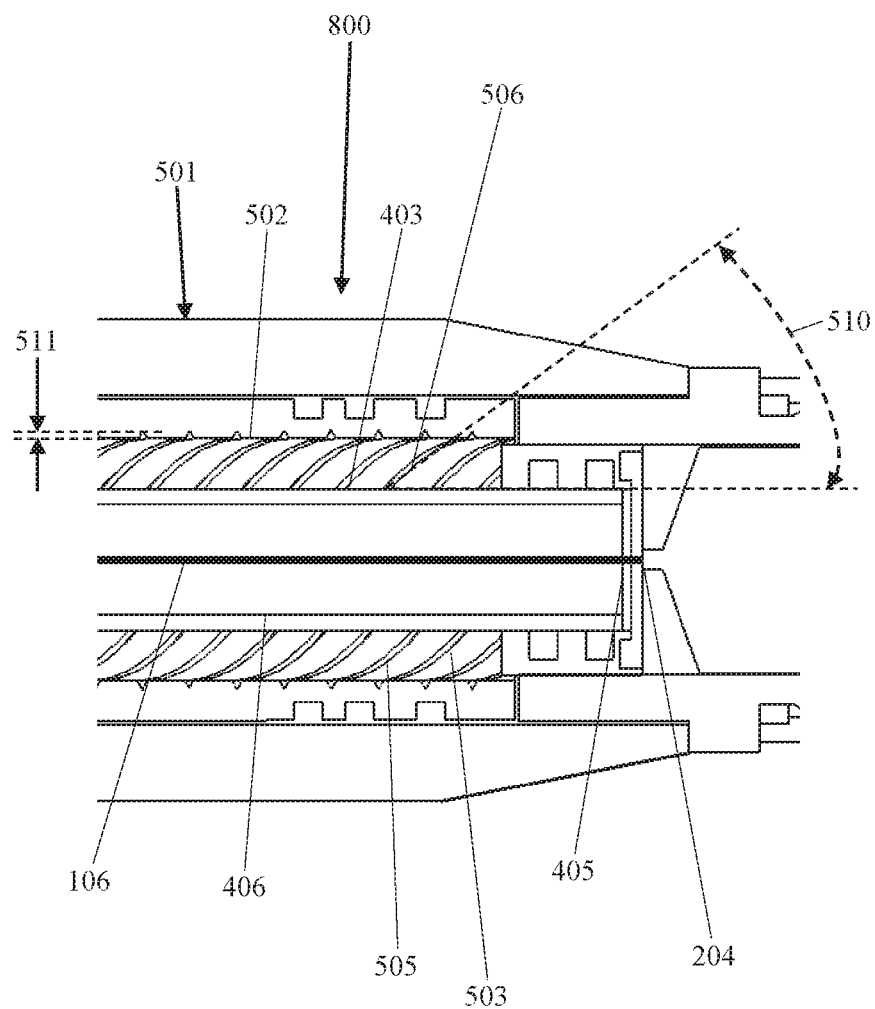
FIG. 8 is a partial enlargement of the cross-section view in FIG. 7 according to the present disclosure.
Figure 9:
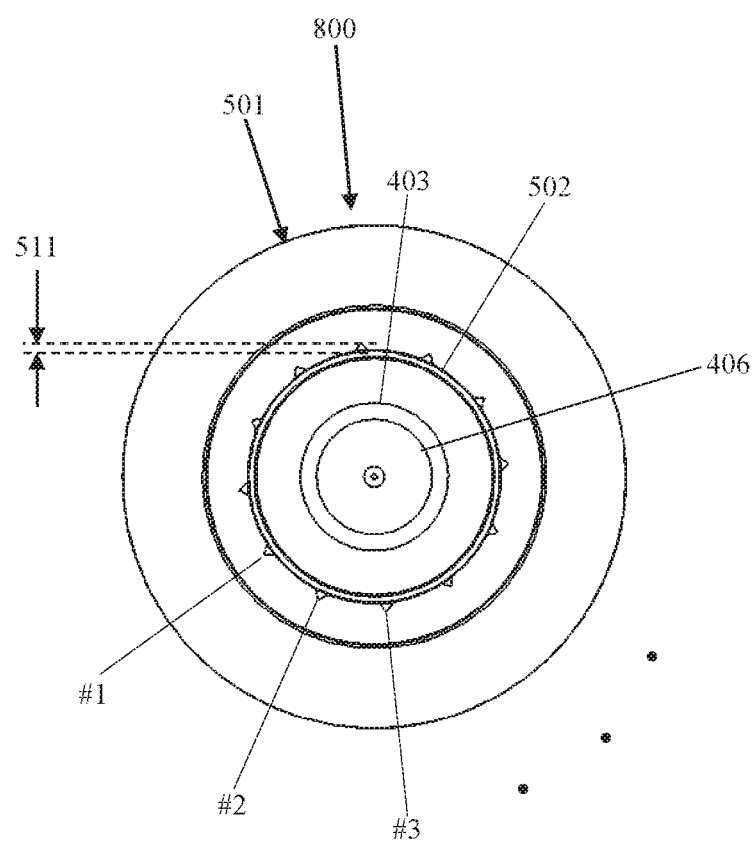
FIG. 9 is another cross-section view of the package of a fiber-optic transport head in a third embodiment according to the present disclosure.

FIG. 7 is a cross-section view of a package of a fiber-optic transport head in a third embodiment according to the present disclosure. In FIG. 7, the package of the fiber-optic transport head 800 comprises all the elements in the package of the fiber-optic transport head 600 as depicted in FIG. 1, except that the waterproof tube 401 in FIG. 1 is embodied by an optically transparent tube 403. FIG. 8 is a partial enlargement of the cross-section view in FIG. 7 according to the present disclosure. FIG. 9 is another cross-section view perpendicular to the forward propagation direction of the laser light in the package of the fiber-optic transport head 800 in the third embodiment according to the present disclosure. In this case, the second inner wall 502 may comprise a second grooved structure 505 configured to increase thermal area of the second inner wall 502 and to facilitate thermal dispersion. The second grooved structure 505 may comprise a second set of internal threads 506. In FIG. 8, the second set of internal threads 506 may comprise a second helix angle 510 in a range of 10 to 30 degrees that the second set of internal threads 506 makes with the conical axis 212 of the right circular cone portion 202 or a line parallel to the conical axis 212. In this case, the cladding modes leaking out of the section of the delivery optical fiber 106 with the cladding exposed, forward propagated, backward propagated, reflected, or scattered, may pass through the optically transparent tube 403 and launch the second set of internal threads 506 numerous times and reflect randomly throughout the cavity 503, resulting in a dramatic temperature reduction on the interface optics 201, the end plug 301, and the housing 501. Furthermore, the second helix angle 510 in the range of 10 to 30 degrees may help make a cooling water flow revolving around an axis line of the cavity 503 and to generate a secondary water flow, thereby enhancing a convective heat transfer and increasing a heat transfer coefficient. In FIG. 8 and FIG. 9, the second set of internal threads 506 may further comprise a tooth height 511 in a range of 0.1 to 0.3 millimeter (mm) to increase heat exchange capability. In FIG. 9, the second set of internal threads 506 may further comprise a tooth number in a range of 40 to 70 around a circumference of the second inner wall 502 to increase surface area of the second inner wall 502 for a heat exchange.

In FIGS. 1, 4, and 7, when the high-power laser light 110 from a fiber laser or a fiber amplifier reaching kWs or tens of kWs is delivered via any one of the fiber-optic transport heads 600, 700, or 800, an optical energy leakage from both forward and backward propagating core-guided light to the adjacent cladding at air-quartz interfaces becomes powerful enough. Once in the cladding, the optical energy leakage induces thermal loads on a polymeric coating surrounding the cladding. If not completely stripped, the optical energy leakage may create localized hot spots and, in the worst cast, damage the section of the delivery optical fiber 106 with the cladding exposed, the cladding mode stripper, the end plug 301, or the interface optics 201 when a damage threshold temperature is reached. When the high-power laser light 110 is incident, the cladding mode stripper removes residual pump energy from the cladding modes in the forward propagating direction and scatters the stripped pump energy in the first inner wall 406 or the cavity 503, depending on which waterproof tube, the copper tube or optically transparent tube, is used. In the backward propagating direction, the reflected laser light from any surfaces in free space, including a workpiece, may be more powerful to damage the section of the delivery optical fiber 106 with the cladding exposed, the cladding mode stripper, the end plug 301, or the interface optics 201 and is launched into the interface optics 201, further refracted to enter the first inner wall 406 and the cavity 503. All of such undesired optical energy, forward propagated, backward propagated, reflected, or scattered, is further reflected by the first set of internal threads 409 or the second set of internal threads 506 or reflected, refracted, and scattered by the interface optics 201 and the end plug 301, rendering a temperature rise. The overall heat is eventually removed or absorbed by the cooling water to keep a uniform temperature around the section of the delivery optical fiber 106 with the cladding exposed, the end plug 301, the interface optics 201, and the housing 501, avoiding any localized hot spots.

In FIGS. 1, 4, and 7, the first set of internal threads 409 and the second set of internal threads 506 may not be any types of screw threads. In FIGS. 5, 6, 8, and 9, although profiles of the first set of internal threads 409 and the second set of internal threads 506 seem to have a triangular shape, they may be of other shapes to maximize convective heat dispersion.

Whereas preferred embodiments of the present disclosure have been shown and described, it will be realized that alterations, modifications, and improvements may be made thereto without departing from the scope of the following claims. Another package of a fiber-optic transport head assembly with a water-cooled and heat-dispersion means using various kinds of combinations to accomplish the same or different objectives could be easily adapted for use from the present disclosure. Accordingly, the foregoing descriptions and attached drawings are by way of example only and are not intended to be limiting.

What is claimed is:

1. A water-cooled package of a fiber-optic transport head, comprising:
    a delivery optical fiber configured to transport a laser light;
    an interface optics comprising a right circular cone portion, a cylindrical portion, and a first end face against a forward propagation direction of the laser light, wherein the right circular cone portion comprises a conical surface with a conical angle greater than a divergence angle of the laser light propagating into the interface optics to avoid optical loss and beam quality degradation due to optical clipping, wherein the first end face protrudes from the right circular cone portion along a conical axis and is fusion-spliced with a section of the delivery optical fiber with a cladding exposed, and wherein the interface optics is configured to expand a beam size of the laser light exiting from the section of the delivery optical fiber with the cladding exposed, thereby reducing power density to a level not exceeding a damage threshold in delivering the laser light from the delivery optical fiber to a free space without accumulating heat created by the laser light forward propagated, backward propagated, reflected, or scattered;
    an end plug comprising a bore and a second end face in the forward propagation direction of the laser light, the bore configured for the delivery optical fiber to pass through;
    a waterproof tube comprising a first end, a second end, a first inner wall, and a first inner hollow space formed by the first end, the second end, and the first inner wall, wherein the first inner hollow space is configured to accommodate the section of the delivery optical fiber with the cladding exposed, wherein the waterproof tube is coupled between the interface optics and the end plug and sealed, and wherein the waterproof tube is configured to keep cooling water from immersing the section of the delivery optical fiber with the cladding exposed, thereby maintaining long-term reliability thereof; and
    a housing comprising a second inner wall and a cavity, the housing configured to hold and fix the interface optics, the end plug, and the waterproof tube, wherein the cavity is formed by an enclosure of the interface optics, the end plug, the waterproof tube, and the second inner wall, and wherein the cavity is configured to accommodate the cooling water to facilitate thermal dispersion,
    wherein:
    the housing is waterproof at each of interfaces between the interface optics and the waterproof tube, between the waterproof tube and the end plug, between the interface optics and the second inner wall, and between the end plug and the second inner wall;
    the first end face protruded from the right circular cone portion facilitates heat-up in a heating process when fusion-spliced with the section of the delivery optical fiber with the cladding exposed; and
    the section of the delivery optical fiber with the cladding exposed is partially coated with a polymer with a higher refractive index than that of the cladding exposed, the section of the delivery optical fiber with the cladding exposed and partially coated with the polymer configured to strip cladding modes therefrom as a cladding mode stripper.

2. The water-cooled package of claim 1, wherein the housing further comprises a pair of water inlet and outlet, the pair of the water inlet and outlet configured to circulate the cooling water and to remove heat from the interface optics, the end plug, and the waterproof tube, facilitating thermal dispersion.

3. The water-cooled package of claim 2, wherein at least one of the pair of water inlet and outlet comprises an inclined angle subtended with the conical axis, wherein the inclined angle is greater than 90 degrees, and wherein the inclined angle is configured to more efficiently circulate the cooling water and to remove heat from the interface optics, the end plug, and the waterproof tube, promoting thermal dispersion.

4. The water-cooled package of claim 1, wherein the waterproof tube is a copper tube.

5. The water-cooled package of claim 4, wherein the first inner wall comprises a first grooved structure configured to increase thermal area of the first inner wall and to facilitate thermal dispersion.

6. The water-cooled package of claim 5, wherein the first grooved structure comprises a first set of internal threads.

7. The water-cooled package of claim 6, wherein the first set of internal threads comprises a first helix angle in a range of 10 to 20 degrees such that the cladding modes from the section of the delivery optical fiber with the cladding exposed launch the first set of internal threads numerous times and reflect randomly throughout the first inner hollow space.

8. The water-cooled package of claim 6, wherein the first set of internal threads further comprises a tooth height in a range of 0.1 to 0.3 millimeter (mm) to increase heat exchange capability.

9. The water-cooled package of claim 6, wherein the first set of internal threads further comprises a tooth number in a range of 40 to 70 around a circumference of the first inner wall to increase surface area thereof for a heat exchange.

10. The water-cooled package of claim 1, wherein the waterproof tube is an optically transparent tube.

11. The water-cooled package of claim 10, wherein the second inner wall comprises a second grooved structure configured to increase thermal area of the second inner wall and to facilitate thermal dispersion.

12. The water-cooled package of claim 11, wherein the second grooved structure comprises a second set of internal threads.

13. The water-cooled package of claim 12, wherein the second set of internal threads comprises a second helix angle in a range of 10 to 30 degrees, wherein cladding modes from the section of the delivery optical fiber with the cladding exposed, passing through the optically transparent tube and launching the second set of internal threads numerous times, reflect randomly throughout the cavity, and wherein the second helix angle is further configured to make a cooling water flow revolving around an axis line of the cavity and to generate a secondary water flow, thereby enhancing a convective heat transfer and increasing a heat transfer coefficient.

14. The water-cooled package of claim 12, wherein the second set of internal threads further comprises a tooth height in a range of 0.1 to 0.3 millimeter (mm) to increase heat exchange capability.

15. The water-cooled package of claim 12, wherein the second set of the internal threads further comprises a second tooth number in a range of 40 to 70 around a circumference of the second inner wall to increase surface area thereof for a heat exchange.

16. The water-cooled package of claim 13, wherein the housing further comprises a pair of water inlet and outlet, the pair of the water inlet and outlet configured to circulate the cooling water and to remove heat from the interface optics, the end plug, and the waterproof tube, facilitating thermal dispersion.

17. The water-cooled package of claim 16, wherein at least one of the pair of water inlet and outlet comprises an inclined angle subtended with the conical axis, and wherein the inclined angle is substantially complementary to the second helix angle to more efficiently circulate the cooling water and to remove heat from the interface optics, the end plug, and the waterproof tube, maximizing thermal dispersion.

18. The water-cooled package of claim 1, wherein the end plug further comprises a secondary holder configured to hold the delivery optical fiber without introducing stress on the delivery optical fiber.

19. The water-cooled package of claim 1, wherein the first end face comprises a diameter greater than a cladding diameter of the section of the delivery optical fiber with the cladding exposed to maximize optical energy received from the section of the delivery optical fiber with the cladding exposed.

* * * * *